United States Patent
Kim

(10) Patent No.: US 6,873,582 B2
(45) Date of Patent: Mar. 29, 2005

(54) INFORMATION RECORDING METHOD AND APPARATUS

(75) Inventor: Dae Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/780,710

(22) Filed: Feb. 19, 2004

(65) Prior Publication Data

US 2004/0160869 A1 Aug. 19, 2004

Related U.S. Application Data

(63) Continuation of application No. 09/852,806, filed on May 11, 2001, now Pat. No. 6,754,148.

(30) Foreign Application Priority Data

May 13, 2000 (KR) ........................................ 2000-25628

(51) Int. Cl.[7] ................................................. G11B 5/09
(52) U.S. Cl. .................................. 369/47.22; 369/59.24
(58) Field of Search .......................... 369/47.21, 47.22, 369/47.27, 47.31, 59.23, 59.24; 360/40, 49, 51

(56) References Cited

U.S. PATENT DOCUMENTS 4,942,565 A * 7/1990 Lagadec .................. 369/47.49
5,815,486 A   9/1998 Kobayashi et al.
5,953,297 A   9/1999 Maeda et al.
5,999,504 A   12/1999 Aoki
6,125,089 A * 9/2000 Shigemori ............... 369/47.22
6,657,938 B1  12/2003 Sako et al.

FOREIGN PATENT DOCUMENTS

JP          10-069646 A     3/1998

* cited by examiner

*Primary Examiner*—Thang V. Tran
(74) *Attorney, Agent, or Firm*—Birch, Stewart, Kolasch & Birch, LLP

(57) ABSTRACT

In an information recording method and apparatus which is capable of improving a recording density of an optical recording medium, a carrier signal is detected in an optical recording medium preformatted as first unit regions by modulating a synchronous signal dividing a track into first unit regions having a certain volume and address information indicating the first unit regions as time information format, and the address information is restored by the detected carrier signal. The restored address information is converted into a linear code, the converted linear code is counted with a clock signal varied in accordance with a volume of the second unit regions different from a volume of the first unit regions. Logical address information indicating the second unit regions is generated, and a record clock signal varied in accordance with a recording density of the second unit regions is generated, accordingly a recording density of an optical recording medium can improve.

14 Claims, 9 Drawing Sheets

INFORMATION RECORDING METHOD AND APPARATUS

The present application is a continuation of U.S. patent application Ser. No. 09/852,806 filed on May 11, 2001, now U.S. Pat. No. 6,754,148, for which priority is claimed under 35 U.S.C. § 120. This application also claims priority under 35 U.S.C. § 119(a) on Patent Application No(s). 25628/2000 filed in Korea on May 13, 2000. The entire contents of each of these applications are herein fully incorporated by reference.

BACKGROUND OF THE INVENTION

1. Field of the Invention

The present invention relates to a method for recording information onto a recording medium, and in particular to an information recording method and apparatus which is capable of improving a recording density of an optical recording medium.

2. Description of the Prior Art

Generally, a CD (Compact Disc) recording and/or reproducing apparatus records and/or reproduces information by irradiating a laser light beam onto an optical recording medium. The optical recording medium can be divided into a reproduction only disc and a recordable disc.

Recordable data is recorded on the compact disc as an EFM (Eight to Fourteen Modulation) frame of a 588 channel bit unit. One block including 98-number of EFM frames forms a sub-code frame as a basic unit capable of performing addressing. Herein, the sub-code frame is a minimum unit of time information and includes main channel data of 2352 byte.

The CD recording and/or reproducing apparatus performs random-access of information on the basis of a Q-code as a time code format included in the sub-code frame. The CD recording and/or reproducing apparatus such as a CD-R (CD-Recordable), a CD-RW (CD Re-Writable) will now be described with reference to accompanying FIG. 1.

FIG. 1 is a waveform diagram illustrating an ATIP (Absolute Time In Pre-groove) frame recorded as a wobble signal onto an optical recording medium in accordance with the prior art.

As depicted in FIG. 1, the CD recording and/or reproducing apparatus in accordance with the prior art records user information onto a wobbled groove track 103 as a pit 102 corresponding to binary information. A wobbled land track 101 is formed between the wobbled groove tracks. A wobble signal is preformatted on the both sides of wobbled groove track 103 with a certain cycle, the wobble signal controls a rotation velocity of a spindle motor (not shown) and is used as a reference signal generating a recording channel clock signal. In addition, ATIP (Absolute Time In Pre-groove) information capable of performing a physical addressing can be recorded by converting the wobble signal preformatted on the both sides of the wobbled groove track 103 into a carrier signal. Herein, a basic unit of the recorded ATIP information is an ATIP frame, one ATIP frame corresponds to a 294-wobble cycle of the wobble signal recorded on the both sides of wobbled groove track 103. A frame synchronous signal (Synch) is recorded on a start position of the ATIP frame, ID (IDentifier) information and a CRC (Cyclic Redundancy Check) code as an ECC (Error Correction Code) are recorded in the ATIP frame.

The frame synchronous signal (Synch) is recorded from a frame start to a 28-wobble cycle in the total 294 wobble cycle of the ATIP frames, the ID code and ECC are recorded on the rest of the wobble cycle. Herein, the ID code is a time code described as minute (MM):second (SS):frame(FF), and the time code is time information of a sub-code frame.

Meanwhile, in recording of user information, a sub-code frame is recorded so as to correspond to a preformatted ATIP frame one-to-one. One sub-code frame includes 588×98 number of channel bits. In addition, in recording of user information, the sub-code frame requires a write channel clock signal corresponding to 196-times of a 294 wobble cycle of the ATIP frame in order to perform sampling of recordable data. Hereinafter, an ATIP (Absolute Time In Pre-groove) information pre-format apparatus will now be described with reference to accompanying FIG. 2.

FIG. 2 is a block diagram illustrating the ATIP information pre-format apparatus in accordance with the prior art.

As depicted in FIG. 2, the ATIP (Absolute Time In Pre-groove) information pre-format apparatus in accordance with the prior art includes a clock generator 201 generating a clock signal of 44.1 kHz, a second frequency divider 202 outputting a carrier signal by being inputted the clock signal of 44.1 kHz, a first frequency divider 204 generating a bi-phase clock signal (PLCK) by being inputted the clock signal of 44.1 kHz, a bi-phase modulator 205 generating a DPS (Dual Phase Signal) by converting a channel bit stream (PCHB) from an input line 206 by the bi-phase clock signal (PCLK), and a frequency modulator 203 being inputted the carrier signal and DPS (Dual Phase Signal), frequency-modulating the DPS and outputting it. Herein, the channel bit stream (PCHB) is generated by channel-coding the ATIP information, it includes an ATIP frame synchronous signal (Synch), an ATIP ID (IDentification) code and an ECC (Error Correction Code). The ATIP ID code includes address information indicating a physical position of an optical disc and additional disc management information. Hereinafter, the operation of the ATIP pre-format apparatus in accordance with the prior art will now be described.

First, the second frequency divider 202 generates a carrier signal (fc) of 22.05 kHz by dividing a clock signal of 44.1 kHz by 2.

The first frequency divider 204 generates a bi-phase clock signal (PCLK) of 6.3 kHz by dividing the clock signal of 44.1 kHz from the clock generator 201 by 7.

The bi-phase modulator 205 generates a DPS (Dual Phase Signal) by converting the channel bit stream (PCHB) from the input line 206 with the bi-phase clock signal (PCLK). Herein, the DPS is frequency-converted by the frequency modulator 203 and is outputted through an output line 207. Accordingly, a wobble signal preformatted on the optical recording medium is FM-converted in a range of ±1 kHz in a center frequency of 22.05 kHz. Hereinafter, the CD recording and/or reproducing apparatus in accordance with the prior art will now be described with reference to accompanying FIG. 3.

FIG. 3 is a block diagram illustrating the CD recording and/or reproducing apparatus in accordance wit the prior art.

As depicted in FIG. 3, a reproduction processing unit of the CD recording and/or reproducing apparatus in accordance with the prior art includes an optical pickup 301 outputting a push-pull signal, a RF (Radio Frequency) signal processing unit 302 generating a high frequency signal by signal-processing the push-pull signal, a demodulation/sub-code detecting unit 303 generating reproduction data by being inputted the high frequency signal, and a CIRC (Cross Interleaved Reed-Solomon) decoder 304 correcting errors of the reproduction data by a EFM (Eight to Fourteen Modulation) frame and outputting it. Hereinafter, the operation of the reproduction processing unit of the CD recording and/or reproducing apparatus in accordance with the prior art will now be described.

First, the RF signal processing unit 302 generates a high frequency signal by signal-processing the push-pull signal outputted from the optical pickup 301.

The demodulation/sub-code detecting unit 303 generates reproduction data by amplifying, equalizing and demodulating the high frequency signal from the RF signal processing unit 302.

The CIRC decoder 304 corrects errors of the reproduction data by the EFM frame.

In the meantime, a record processing unit of a recordable CD recording and/or reproducing apparatus in accordance with the prior art includes an optical pickup 301 outputting a push-pull signal, a wobble signal detecting unit 308 detecting a wobble signal by passing the push-pull signal through a carrier signal bandwidth, an ATIP (Absolute Time In Pre-groove) decoder 309 restoring ATIP (Absolute Time In Pre-groove) information as a physical address by using the wobble signal and generating a flag signal (ID-FLAG), a CIRC encoder 307 inserting an error correction code into inputted recordable data, a modulation/sub-code inserting unit 306 modulating the recordable data into an EFM (Eight to Fourteen Modulation) frame by sampling it with a write channel clock signal (WRT-CLK) and inserting an inputted sub-code into the EFM frame, a laser power controller 305 controlling a laser diode of the optical pickup 301 in accordance with a record channel signal from the modulation/sub-code inserting unit 306, and a microcomputer 310 generating a record start signal (WRT-ON) by synchronizing with the flag signal (ID-FLAG) from the ATIP decoder 309 and generating a sub-code by using an ID code. Hereinafter, the operation of the recordable CD recording and/or reproducing apparatus in accordance with the prior art will now be described.

First, the wobble signal detecting unit 308 detects a wobble signal by bandwidth-passing a push-pull signal outputted form the optical pickup 121 through a carrier signal bandwidth of 22.05 kHz. In more detail, as depicted in FIG. 4, the wobble signal detecting unit 308 is constructed with a BPF (Band Pass Filter) 401 and detects the wobble signal by bandwidth-passing the push-pull signal outputted form the optical pickup 301 through the carrier signal bandwidth of 22.05 kHz.

The ATIP decoder 309 restores ATIP information as a physical address by using the wobble signal form the wobble signal detecting unit 308. The ATIP decoder 309 generates an ID (IDentification) code as time information of minute:second:frame, an ID code error discrimination signal (ID-OK) indicating an error of the ID code, and a flag signal (ID-FLAG) in detecting of ATIP frame synchronous signal (Synch). In addition, the ATIP decoder 309 generates a write channel clock signal (WRT-CLK) for sampling recordable data. Hereinafter, the construction of the ATIP decoder 309 will now be described in detail with reference to accompanying FIG. 4.

FIG. 4 is a detailed block diagram illustrating the ATIP decoder 309 as shown at FIG. 3.

As depicted in FIG. 4, the ATIP decoder 309 includes a slicer 402 being inputted the wobble signal, a PLL (Phase Lock Loop) generating a write channel clock signal (WRT-CLK) by contacting to an output end of the slicer 402, a frequency demodulator 405 frequency-demodulating an output signal of the slicer 402, a bi-phase channel demodulator 407 restoring an output signal of the frequency demodulator 405 as bi-phase channel data, a decoder & latch 408 decoding an ID code of the bi-phase channel data, and a synchronous signal detecting unit 406 detecting a frame synchronous (Synch) signal from an output signal of the frequency demodulator 405. Herein, the PLL includes a phase comparator & LPF (Low Pass Filter) 403 contacted to the output end of the slicer 402, a VCO (Voltage Control Oscillator) 404 contacted to the phase comparator & LPF 403 so as to form a closed-loop, a fourth frequency divider 410 lowering a frequency of the write channel clock signal (WRT-CLK) by dividing the write channel clock signal (WRT-CLK) by 98, a third frequency divider 409 dividing an output signal of the fourth frequency divider 410 by 2, a fifth frequency divider 411 dividing an output signal of the third frequency divider 410 by 7, and a sixth frequency divider 412 dividing an output signal of the fifth frequency divider 411 by 2 and outputting it. The operation of the ATIP decoder 309 in accordance with the prior art will now be described with reference to accompanying FIGS. 3 and 4.

First, the slicer 402 generates a carrier signal by slicing a wobble signal outputted from the BPF (Band Pass Filter) 401 with a certain slice level.

The phase comparator & LPF 403 compares a phase of the carrier signal outputted form the slicer 402 with a phase of an output signal of the second frequency divider 409 and generates a control signal corresponding to the phase difference.

The VCO 404 generates the write channel clock signal (WRT-CLK) by varying a frequency of an oscillation frequency in accordance with the control signal outputted from the phase comparator & LPF 403. Herein, the write channel clock signal (WRT-CLK) is maintained as 4.3218 MHz 196-times increased from the carrier signal (fc=22.05 kHz) of the wobble signal.

The fourth frequency divider 410 lowers a frequency of the write channel clock signal (WRT-CLK) as 44.1 kHz by dividing the write channel clock signal (WRT-CLK) by 98. In addition, the output signal of the fourth frequency divider 410 is inputted to the phase comparator & LPF 403 as a frequency of 22.05 kHz after being divided by 2 by the third frequency divider 409 and is restored as a bi-phase clock signal (PCLK) of 6.3 kHz by being divided by 7 by the fifth frequency divider 411.

The frequency demodulator 405 demodulates the ATIP information by sampling a carrier signal outputted form the slicer 402 in accordance with the write channel clock signal (WRT-CLK).

The synchronous signal detecting unit 406 detects a frame synchronous signal (Synch) in an output signal of the frequency demodulator 405. The frame synchronous signal (Synch) detected from the synchronous signal detecting unit 406 is outputted to the decoder & latch 408, and is outputted to the microcomputer 310 as a flag signal (ID FLAG) indicating a start of the ATIP frame.

The bi-phase demodulator 407 demodulates the bi-phase signal by the bi-phase clock signal (PCLK) inputted from the fifth frequency divider 411 and provides it to the decoder & latch 408.

The decoder & latch 408 restores an ID code from a data channel clock signal (DCLK) that the bi-phase clock signal (PCLK) is divided by 2 and a channel bit stream outputted from the bi-phase demodulator 407 by the frame synchronous signal (Synch), and performs an error correction about the ID code. The ID code detected by the decoder & latch 408 and flag signal (ID FLAG) indicating the error correction are outputted to the microcomputer 310.

The microcomputer 310 generates a record start signal (WRT-ON) by synchronizing with the flag signal (ID FLAG) from the ATIP decoder 309 and generates a sub-code by using the ID code.

The CIRC encoder 307 inserts an error correction code into the inputted recordable data. The modulation/sub-code inserting unit 306 modulates the recordable data from the CIRC encoder 307 into an EFM code by sampling it with the write channel clock signal (WRT-CLK) and inserts the sub-code outputted from the microcomputer 310 into an EFM frame.

The laser power controller 305 controls a laser diode of the optical pickup 310 in accordance with a record channel signal from the modulation/sub-code inserting unit 306.

In recording of user information, the microcomputer 310 generates the record start signal (WRT-ON) by detecting a record start position (MM:SS:FF (START)) of an ATIP frame preformatted on the optical disc in the ID code described as minute:second:frame time information. The modulation/sub-code inserting unit 306 generates a record channel signal by synchronizing with a frame synchronous signal, namely, a flag signal (ID FLAG) starting an ATIP (Absolute Time In Pre-groove) frame.

In the meantime, when a record end position (MM:SS:FF (END)) is detected, the microcomputer 310 cuts off the record start signal (WRT-ON). Herein, the modulation/sub-code inserting unit 306 ends the record channel signal generation by synchronizing with the flag signal (ID FLAG).

As described above, in a recordable optical recording medium such as a CD-R (Compact Disc-Recordable), a CD-RW (Compact Disc Re-Writable), a sub-code frame including user information is recorded so as to correspond one-to-one to an ATIP frame preformatted onto an optical disc. Accordingly, a physical length of sub-code frame is equal to a physical length of an ATIP frame. And, main channel data as the user information is recorded as 2352 byte per one ATIP frame (Absolute Time In Pre-groove).

FIG. 5 is a waveform diagram illustrating input/output of the record processing unit of the CD recording and/or reproducing apparatus as shown at FIG. 3. In more detail, FIG. 5 illustrates an input/output of a flag signal (ID FLAG), an ID code error discrimination signal (ID-OK) indicating an error of an ID code, an ID code described as time information of minute:second:frame, a record start signal (WRT-ON), and a write signal recording user information.

Recently, a recording density of an optical recording medium has been improved in accordance with a development of a blue laser and increase of a diameter of an object lens. However, information has to be recorded by corresponding one-to-one to a physical length of an ATIP frame preformatted onto an optical disc by a unit sub-code frame, accordingly it is difficult to improve a recording density more.

In the meantime, in an information recording method and apparatus of a Korea patent No.0253805, a technique varying a length of a unit record region by generating a logical address different from a physical address preformatted onto an optical disc is represented. However, in the represented recording method, a write channel clock signal which has to vary in accordance with a variable length of unit record regions is not provided accurately.

As described above, the information recording apparatus in accordance with the prior art has to record information so as to correspond one-to-one to a physical length of an ATIP (Absolute Time In Pre-groove) frame preformatted onto an optical disc by a unit sub-code frame, accordingly it is difficult to improve a recording density.

In addition, the information recording apparatus in accordance with the prior art can not provide accurately a write channel clock signal so as to vary in accordance with a variable length of a unit record region.

SUMMARY OF THE INVENTION

Accordingly, an object of the present invention is to provide an information recording method and apparatus which is capable of improving a recording density of an optical recording medium.

Another object of the present invention is to provide an information recording method and apparatus which is capable of providing logical address information varying efficiently in accordance with variation of recording density in unit record regions.

Still another object of the present invention is to provide an information recording method and apparatus which is capable of providing a write channel clock signal varying adaptively in accordance with variable unit record regions.

In order to achieve the objects of the present invention, there is provided an information recording method in accordance with the present invention including detecting a carrier signal in an optical recording medium preformatted as first unit regions by modulating a synchronous signal dividing a track into first unit regions having a certain volume and address information indicating the first unit regions as time information format, restoring the address information by the detected carrier signal, converting the restored address information into a linear code, generating logical address information indicating second unit regions by counting the linear code with a clock signal varied in accordance with a volume of second unit regions different from the volume of first unit regions, generating a record clock signal varied in accordance with a recording density of the second unit regions, and recording user information onto the optical recording medium so as to correspond to the second unit regions by synchronizing with the record clock signal.

In order to achieve the objects of the present invention, there is provided an information recording apparatus in accordance with the present invention including a carrier signal detecting means for detecting a carrier signal in an optical recording medium preformatted as first unit regions by modulating a synchronous signal dividing a track into first unit regions having a certain volume and address information indicating the first unit regions as time information format, a decoding means for restoring the address information by the detected carrier signal, a linear code converting means for converting the restored address information into a linear code, an address generating means for generating logical address information indicating the second unit regions by counting the linear code with a clock signal varied in accordance with a volume of the second unit regions different from the volume of the first unit regions, a record clock signal generating means for generating a record clock signal varied in accordance with a recording density of the second unit regions, and an information recording means for recording user information onto the optical recording medium so as to correspond to the second unit regions by synchronizing with the record clock signal.

DETAILED DESCRIPTION OF THE PREFERRED EMBODIMENT

Hereinafter, an information recording method and apparatus in accordance with the preferred embodiment of the present invention will now be described with reference to accompanying FIGS. 6~10.

Figure 1:
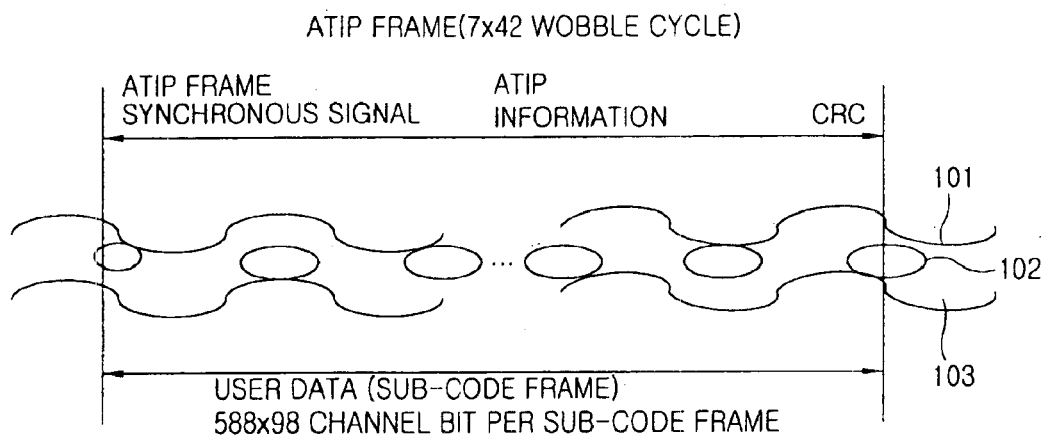
FIG. 1 is a waveform diagram illustrating an ATIP (Absolute Time In Pre-groove) frame recorded as a wobble signal onto an optical recording medium in accordance with the prior art.
Figure 2:
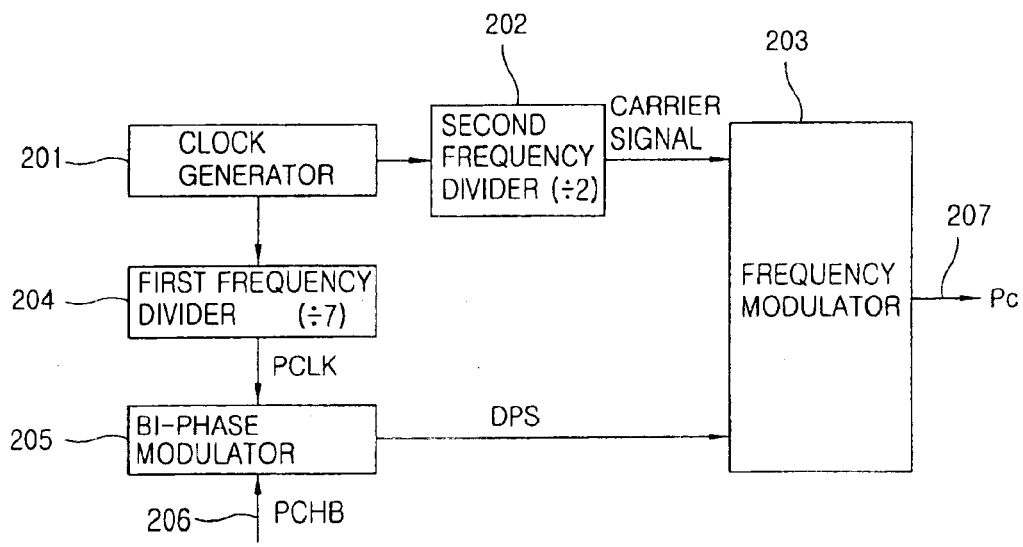
FIG. 2 is a block diagram illustrating an ATIP (Absolute Time In Pre-groove) information pre-format apparatus in accordance with the prior art.
Figure 3:
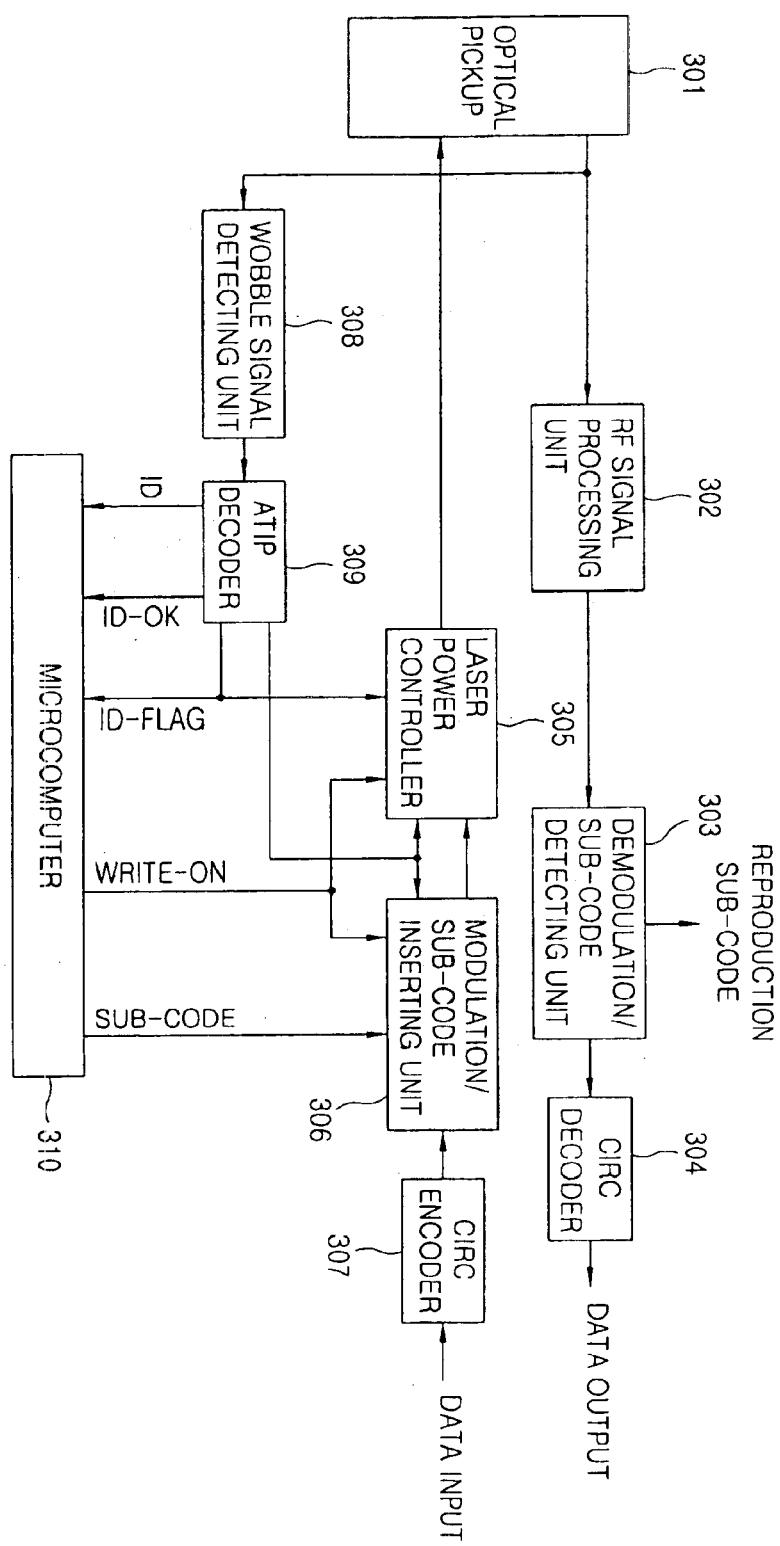
FIG. 3 is a block diagram illustrating a CD recording and/or reproducing apparatus in accordance with the prior art.
Figure 4:
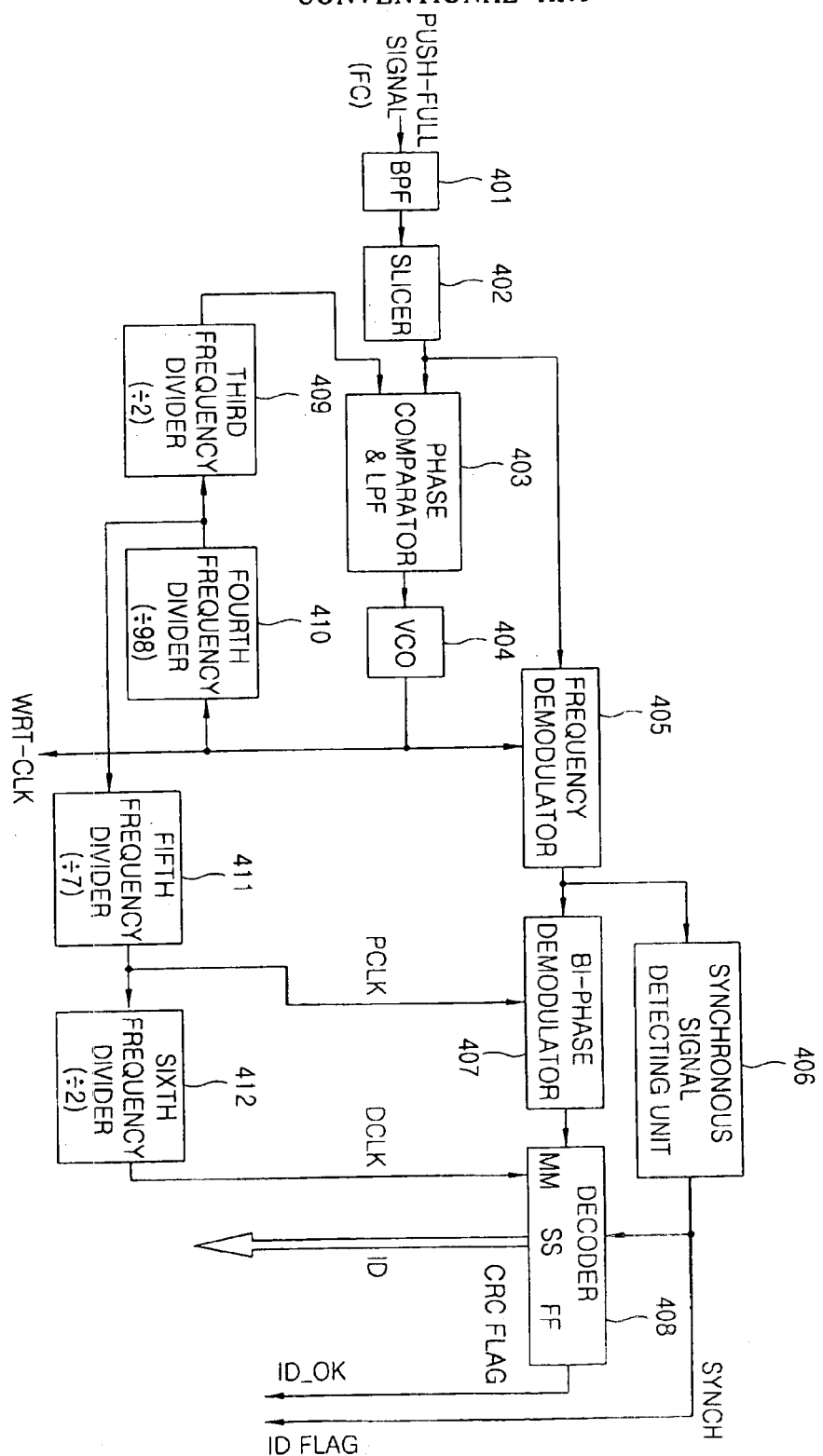
FIG. 4 is a detailed block diagram illustrating an ATIP decoder as shown at FIG. 3.
Figure 5:
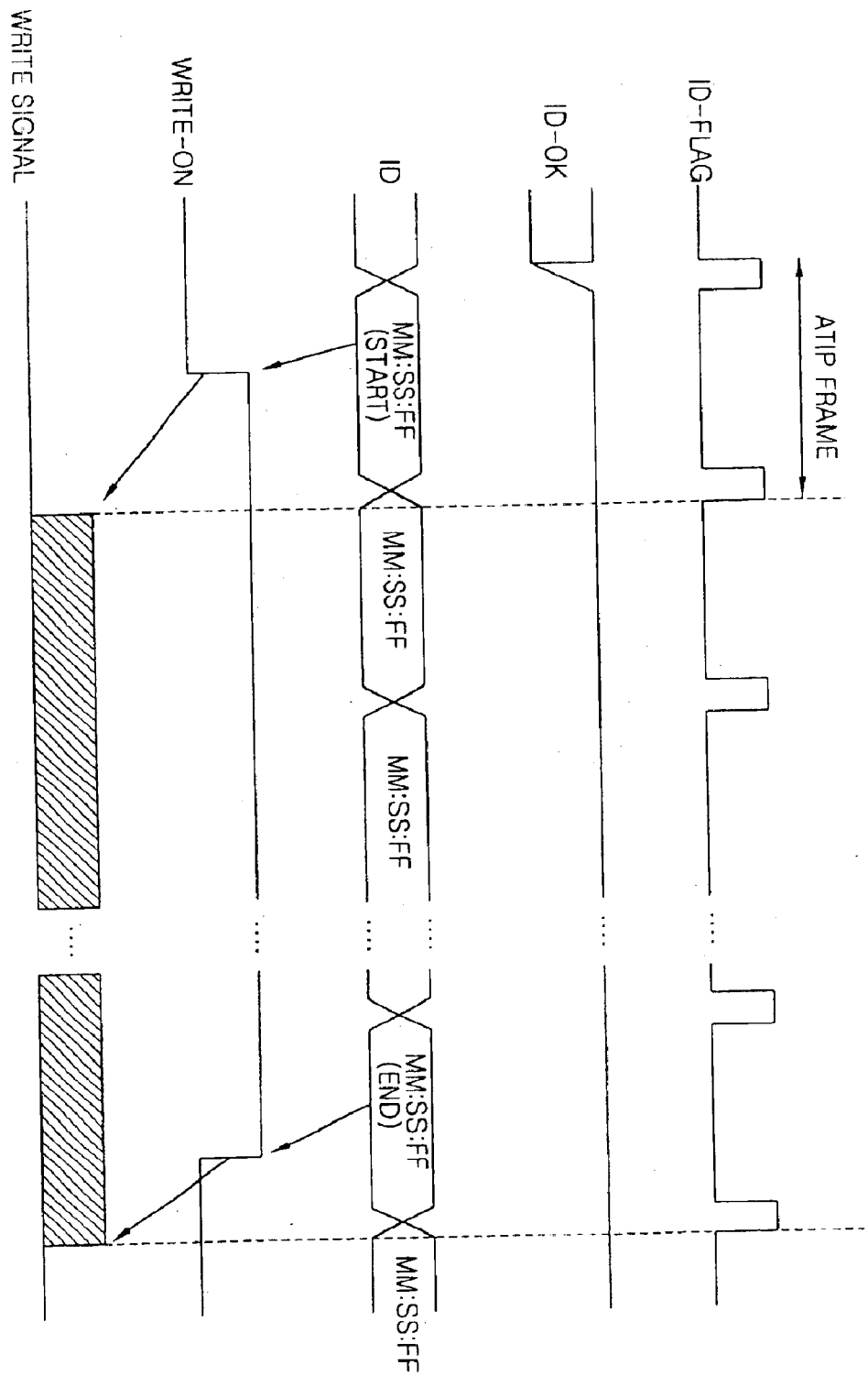
FIG. 5 is a waveform diagram illustrating an input/output of a record processing unit of the CD recording and/or reproducing apparatus as shown at FIG. 3.
Figure 6:
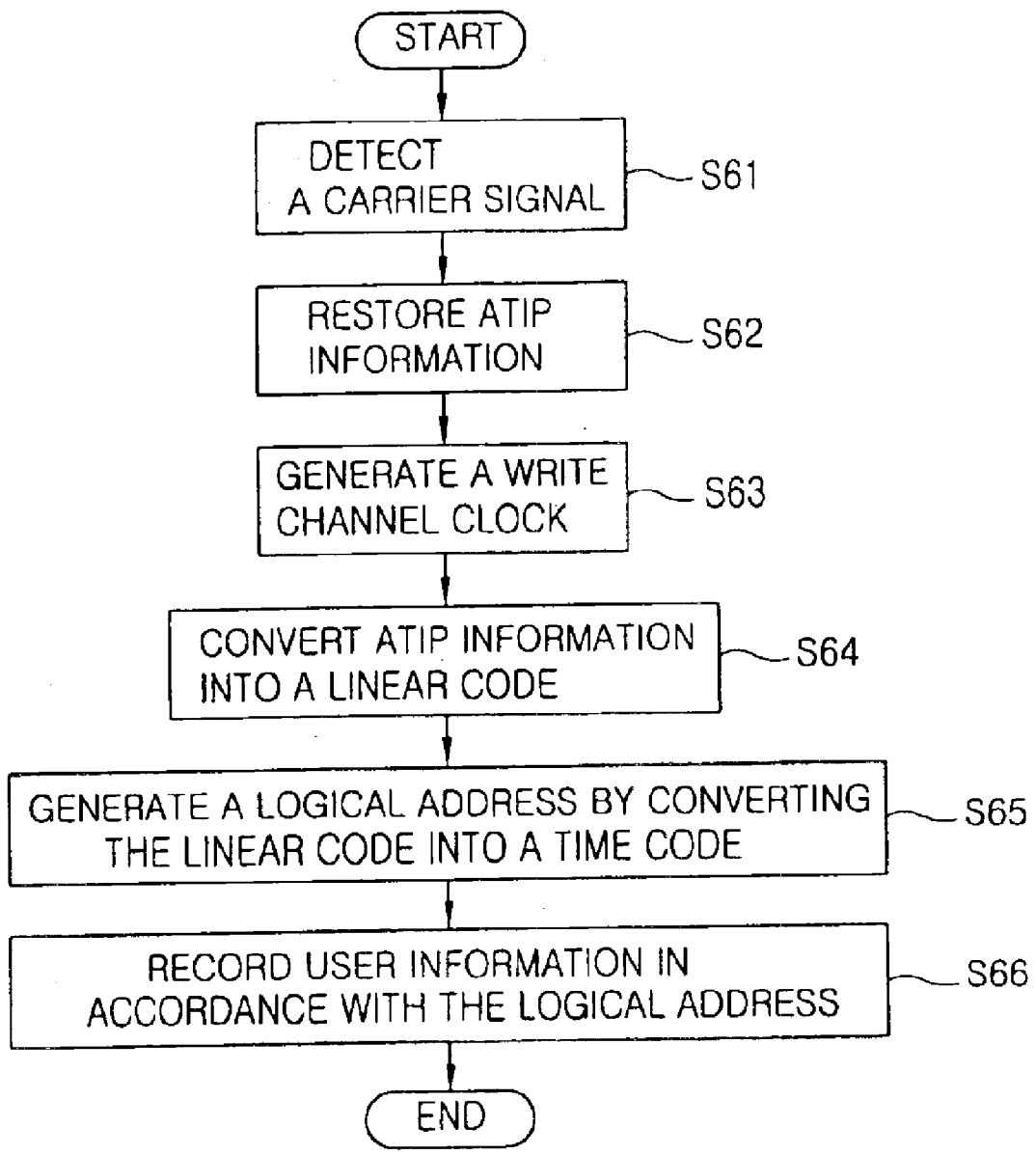
FIG. 6 is a flow chart illustrating an information recording method in accordance with the present invention.

FIG. 6 is a flow chart illustrating an information recording method in accordance with the present invention.

First, a carrier signal (fc) of ATIP (Absolute Time In Pre-groove) information preformatted onto an optical recording medium is detected as shown at ST61. Herein, the ATIP information is displayed and preformatted onto the optical recording medium as time information.

The ATIP information is restored by frequency-demodulating the detected carrier signal (fc) and bi-phase-demodulating it as shown at S62. The restored ATIP information includes a synchronous signal (Synch), an ID code and an error correction code by a certain frame (data sector) unit. Herein, the ID code passes an error correction procedure in a demodulating process of the ATIP information.

After that, a write channel clock signal (CWRT-CLK) is generated so as to be appropriate to a recording density of a sub-code frame to be recorded as shown at S63. In addition, an ID code (LID) of the restored ATIP information is converted into a linear code and a physical length of the linear code is adjusted in accordance with an adjustment rate m/R of the recording density as shown at S64. Herein, the m and R are integers not greater than 0. And, a logical address signal indicating to record user information as a length different from the physical length of ATIP frame is generated by converting the adjusted linear code into a time code as shown at S65. Herein, the ATIP frame means a basic unit for recording the ATIP information.

By recording the user information onto the optical recording medium in accordance with the logical address signal as shown at S66, the user information is recorded onto the optical recording medium with a length different from the physical address length preformatted onto the optical recording medium. The information recording apparatus by above-described information recording method will now be described in detail with reference to accompanying FIG. 7.

Figure 7:
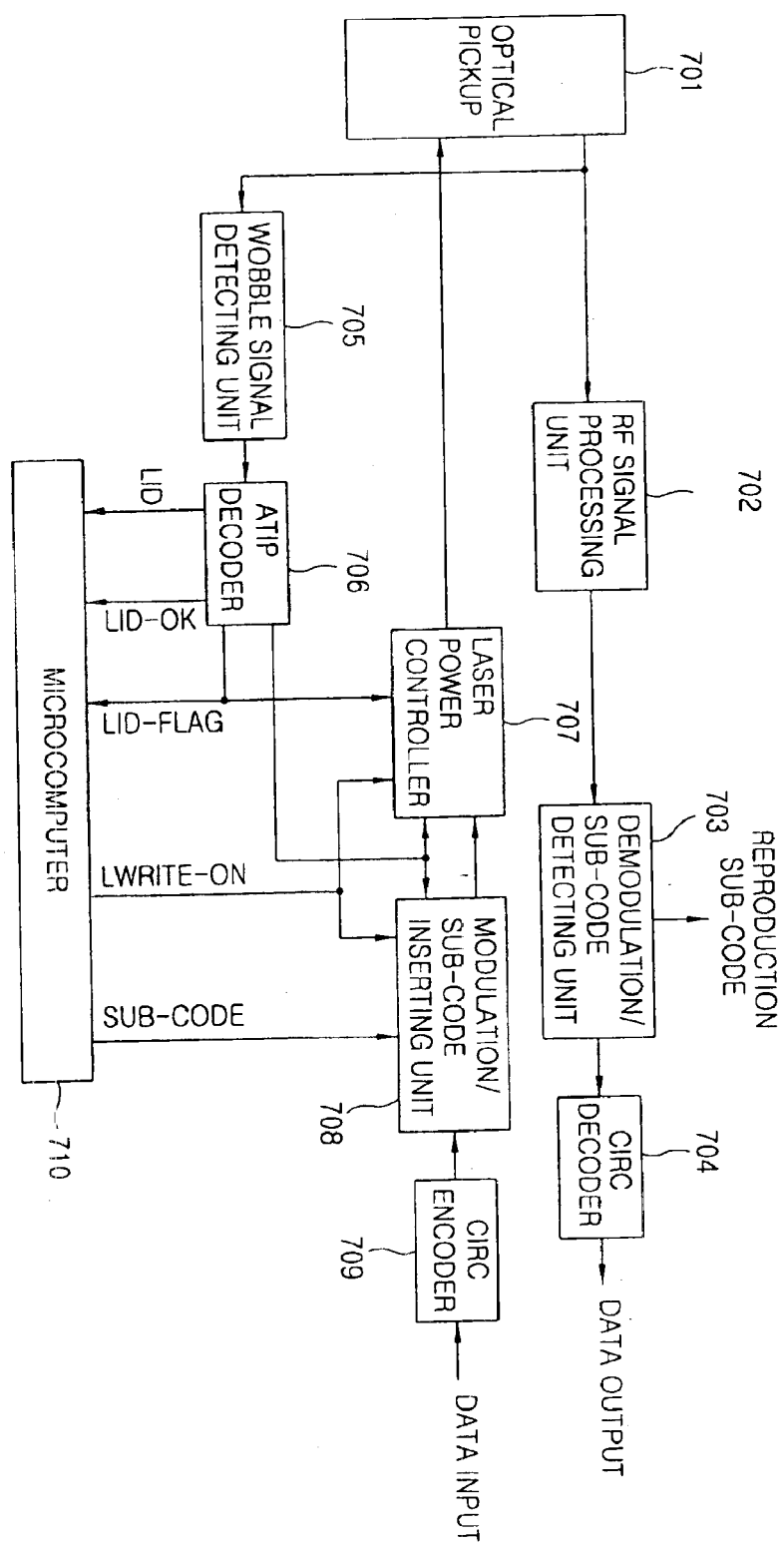
FIG. 7 is a block diagram illustrating an information recording apparatus in accordance with the present invention.

FIG. 7 is a block diagram illustrating an information recording apparatus in accordance with the present invention.

As depicted in FIG. 7, a reproduction processing unit of the information recording apparatus includes an optical pickup 701 outputting a push-pull signal, a RF (Radio Frequency) signal processing unit 702 serial-contacted to an output end of the optical pickup 701 and generating a high frequency signal by being inputted the push-pull signal, a demodulation/sub-code detecting unit 703 generating reproduction data by being inputted the high frequency signal, and a CIRC (Cross Interleaved Reed-Solomon) decoder 704 correcting an error of the reproduction data by an EFM (Eight to Fourteen Modulation) frame. The operation of the reproduction processing unit of the information recording apparatus in accordance with the present invention will now be described in detail.

First, the RF signal processing unit 702 generates a high frequency signal by signal-processing the push-pull signal outputted from the optical pickup 701, the demodulation/sub-code detecting unit 703 generates reproduction data by demodulating the signal after amplifying and equalizing. The CIRC decoder 704 corrects an error of the reproduction data by the EFM frame (Eight to Fourteen Modulation).

In the meantime, as depicted in FIG. 7, a record processing unit of the information recording apparatus in accordance with the present invention includes the optical pickup unit 701 outputting the push-pull signal, a wobble signal detecting unit 705 detecting a wobble signal by bandwidth-passing the push-pull signal through a carrier signal bandwidth of 22.05 kHz, an ATIP (Absolute Time In Pre-groove) decoder 706 restoring ATIP (Absolute Time In Pre-groove) information as a physical address by using the wobble signal, generating a flag signal (LID-flag) indicating a start position of an ID code of the restored ATIP information and generating a write channel clock signal (CWRT-CLK) adaptable to a present recording density, a CIRC (Cross Interleaved Reed-Solomon) encoder 709 inserting an error correction code by being inputted the user information (recordable data), a modulation/sub-code inserting unit 708 modulating the recordable data outputted from the CIRC encoder 709 into an EFM code by sampling the recordable data with the write channel clock signal (CWRT-CLK) and inserting a sub-code into the EFM frame, a laser power controller 707 controlling a laser diode of the optical pickup 701 in accordance with the write channel clock signal (CWRT-CLK) from the modulation/sub-code inserting unit 708, and a microcomputer 710 generating a record start signal (LWRT-ON) by synchronizing with the flag signal (LID-FLAG) from the ATIP decoder 706 and generating the sub-code by using an ID code (LID). Herein, construction of the ATIP decoder 706 will now be described in detail with reference to accompanying FIG. 8.

Figure 8:
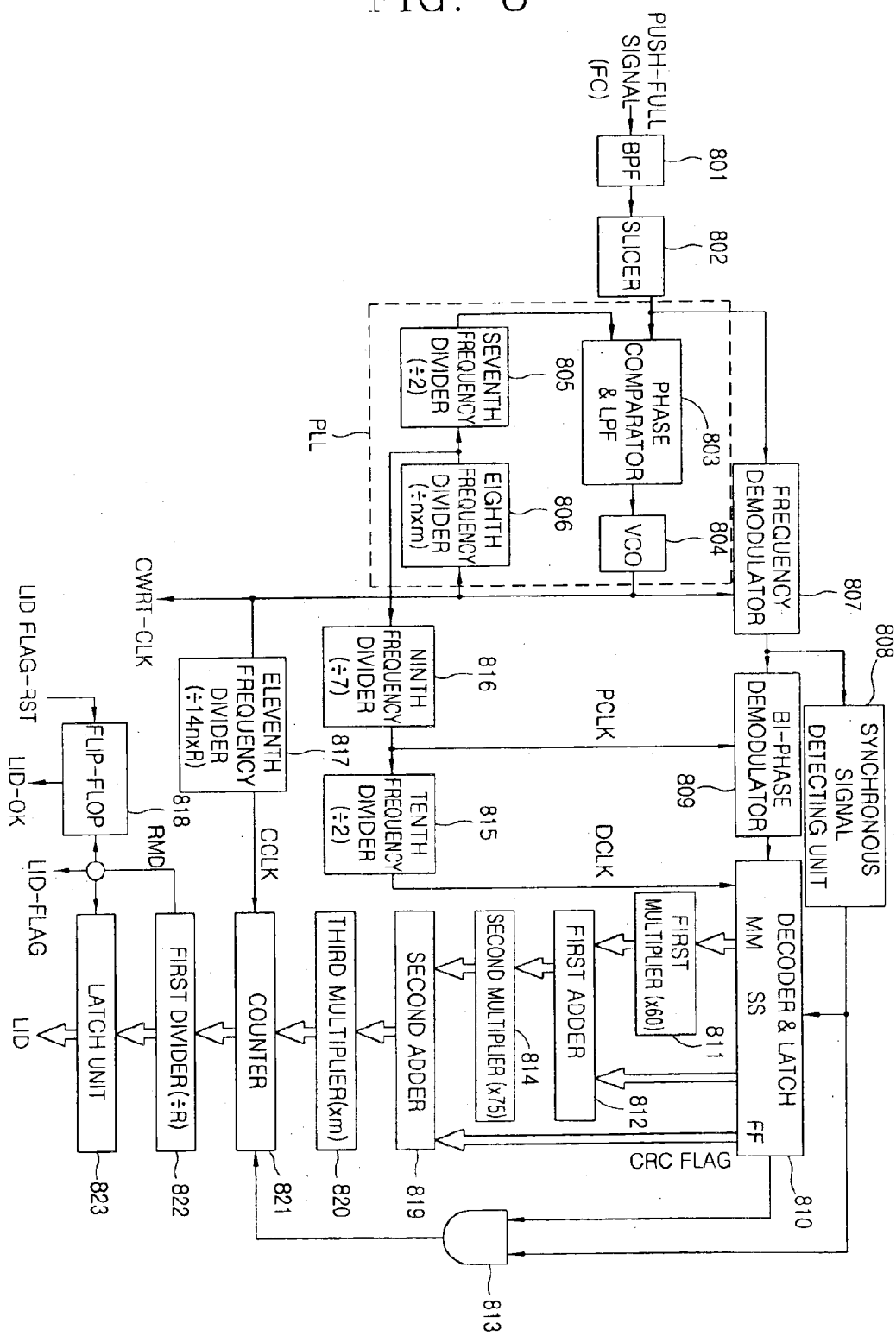
FIG. 8 is a detailed block diagram illustrating an ATIP decoder as shown at FIG. 7.

FIG. 8 is a detailed block diagram illustrating the ATIP decoder as shown at FIG. 7.

As depicted in FIG. 8, the ATIP decoder 706 includes a slicer 802 being inputted the wobble signal, a PLL (Phase Lock Loop) contacted to an output end of the slicer 802 and generating the write channel clock signal (CWRT-CLK), a frequency demodulator 807 frequency-demodulating the wobble signal from the slicer 802, a bi-phase channel demodulator 809 restoring an output signal from the frequency demodulator 807 as bi-phase channel data, a decoder & latch 810 decoding an ID code (CID) from the bi-phase channel data, a synchronous signal detecting unit 808 detecting a frame synchronous signal (Synch) in an output signal from the frequency demodulator 807, an AND gate 813 outputting a logical signal in accordance with the ID code (CID) and frame synchronous signal (Synch), a first multiplier 811, a first adder 812, a second multiplier 814 and a second adder 819 converting the ID code (CID) outputted from the decoder & latch 810 into a linear code, a third multiplier 820 and a counter 821 adjusting a physical length of the converted linear code in accordance with a preset recording density adjustment ratio m/R, a first divider 822 dividing an output value of the counter 821 by a certain value "R", a latch unit 823 contacted to the first divider 822 and converting the linear code into a time code adaptable to an optical recording medium, a flip-flop 818 generating an ID code error discrimination signal (LID-OK) by being inputted an output value from the first divider 822 and a reset signal (LID FLAG-RST) from the microcomputer 710. Herein, the PLL includes a phase comparator & LPF 803 contacted to an output end of the slicer 802, a VCO (Voltage Control Oscillator) 804 contacted to the phase comparator & LPF 803 so as to form a closed-loop, an eighth frequency divider 806 converting a frequency by dividing the write channel clock signal (CWRT-CLK) by n×m, and a seventh frequency divider 805 dividing an output signal of the eighth divider 806 by 2. In addition, the construction of the latch unit 823 will now be described in detail with reference to accompanying FIG. 9.

Figure 9:
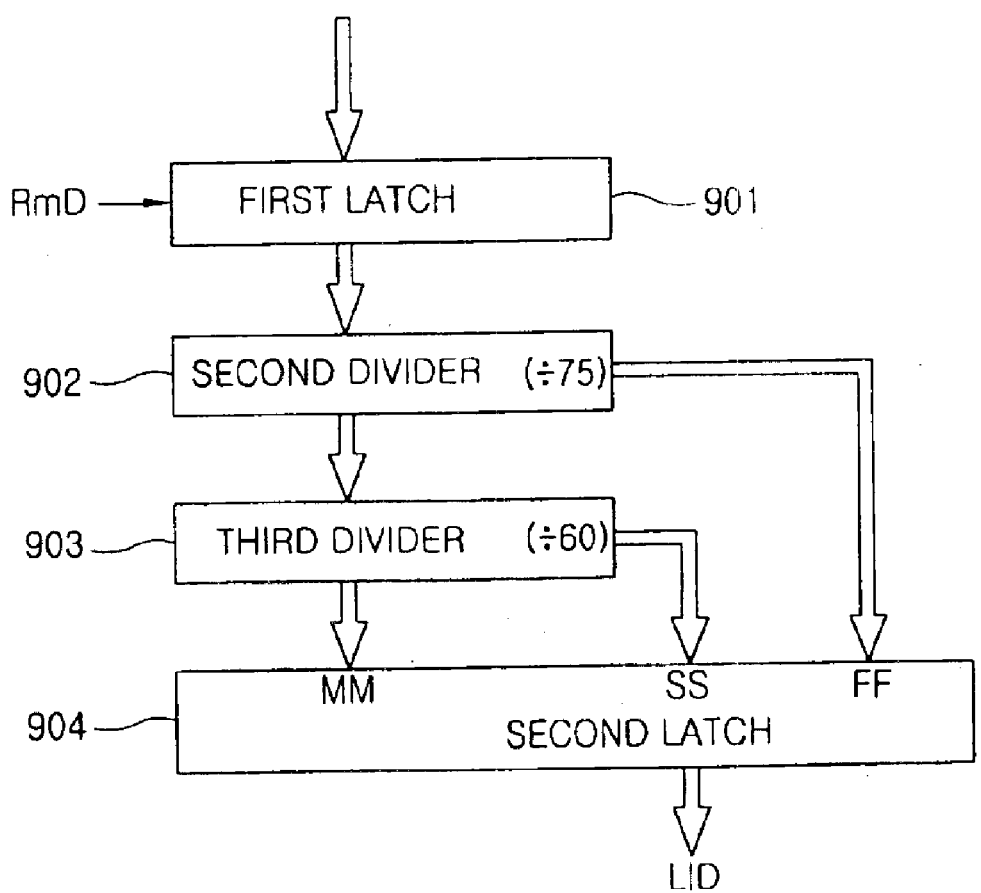
FIG. 9 is a detailed block diagram illustrating a latch unit as shown at FIG. 8.

FIG. 9 is a detailed block diagram illustrating the latch unit as shown at FIG. 8.

As depicted in FIG. 9, the latch unit 823 includes a first latch 901 contacted to the first divider 822 and outputting a quotient from the first divider 822 whenever a remainder (RMD) is "0", a second divider 902 serial-contacted to the first latch 901, dividing an output signal of the first latch 901 by 75 and outputting a quotient, a third divider 903 dividing an output signal of the second divider 902 by 60 and outputting a quotient and a second latch 904 outputting the ID code (LID) by being inputted output signals of the second divider 902 and third divider 903.

Hereinafter, the operation of a record processing unit of the information recording apparatus in accordance with the present invention will now be described in detail with reference to accompanying FIGS. 7~9.

First, the wobble signal detecting unit 705 detects a wobble signal in a push-pull signal outputted from the optical pickup 701 by passing the push-pull signal through a carrier signal bandwidth of 22.05 kHz. Herein, the wobble signal detecting unit 705 is constructed with a BPF (Band Pass Filter) same as the BPF 801 as shown at FIG. 8 and detects a wobble signal by passing the push-pull signal outputted from the optical pickup 701 through a carrier signal bandwidth of 22.05 kHz.

The ATIP decoder 706 restores the ATIP information as a physical address by using the wobble signal detected from the wobble signal detecting unit 705. In addition, the ATIP decoder 706 generates a write channel clock signal (CWRT-CLK) adaptable to a present recording density, converts an ID code of the restored ATIP information into a linear code, adjusts a length of the linear code in accordance with the adjustment ratio m/R of the recording density, and converts it into a time code. The ID code (LID) converted into the time code is inputted to the microcomputer 710. In addition, the ATIP decoder 706 generates an error discrimination signal (LID-OK) indicating an error of the ID code (LID) and a flag signal (LID-flag) indicating a start position of the ID code (LID) by performing an error correction of the ID code (LID). In addition, the ATIP decoder 706 generates a write channel clock signal (CWRT-CLK) its frequency varies adaptively in accordance with a recording density in order to record same quantity of recordable data per a sub-code frame. The operation of the ATIP decoder 706 will now be described in more detail with reference to accompanying FIG. 8.

First, the slicer 802 generates a carrier signal by slicing a wobble signal outputted from the BPF 801 with a certain slice level.

The phase comparator & LPF 803 compares a phase of the carrier signal outputted from the slicer 802 with a phase of an output signal of the seventh frequency divider 805 and generates a control signal corresponding to the phase difference.

The VCO 804 generates the write channel clock signal (CWRT-CLK) by varying an oscillation frequency in accordance with the control signal outputted from the phase comparator & LPF 803. The number of clock of the write channel clock signal (CWRT-CLK) per one frame is defined as 2n×m (herein, n is an integer not less than 0) and is determined as integer-times of the wobble signal. Herein, n can be set as 2 or 14, when n and R are set as 14, 7, respectively, the m can be set as 7, 8, 9, 10, 11, 12, 13, . . . in accordance with a recording density of a present recording frame.

The eighth frequency divider 806 converts a frequency of the write channel clock signal (CWRT-CLK) as 44.1 m (2×fc) kHz by dividing the record channel clock signal (CWRT-CLK) by n×m. The output signal of the eighth frequency divider 806 is inputted to the phase comparator & LPF 803 by being divided by 2 by the seventh frequency divider 805, and is restored as a bi-phase clock signal (PCLK) of 6.3 kHz by being divided by 7 by the ninth frequency divider 816.

The frequency demodulator 807 demodulates the ATIP information by sampling the carrier signal outputted from the slicer 802 with the write channel clock signal (WRT-CLK).

The synchronous signal detecting unit 808 detects a frame synchronous signal (Synch) in the ATIP information from the frequency demodulator 807. The frame synchronous signal (Synch) detected from the synchronous signal detecting unit 808 is inputted to the decoder & latch 810.

The bi-phase demodulator 809 demodulates a bi-phase signal by the bi-phase clock signal (PCLK) inputted from the seventh frequency divider 816 and provides the demodulated bi-phase signal to the decoder & latch 810.

The decoder & latch 810 restores an ID code from a channel bit stream inputted from the bi-phase demodulator 809 by the data channel clock signal (DCLK) which is generated by dividing the bi-phase clock signal (PCLK) by 2 and frame synchronous signal (Synch) and performs an error correction about the ID code by using an error correction code (CRC). In addition, the decoder & latch 810 generates a CRC flag signal (CRC FLAG) indicating an error occurrence position.

The first multiplier 811 multiplies 60 by minute information of the ID code outputted from the decoder & latch 810, and the first adder 812 adds the minute information converted into second information to second information from the decoder & latch 810.

The second multiplier 814 multiplies 75 by an output signal of the first adder 812 in order to convert the output signal into a frame volume.

The second adder 819 converts the ID code (LID) as the time code format into a linear code by adding frame information from the decoder & latch 810 into the output signal of the second multiplier 814. The output signal of the second adder 819 which is address information corresponding to a present position of an ATIP frame accessed at present is inputted to the third multiplier 820.

The third multiplier 820 multiplies the m by the output signal of the second adder 819 and provides it to the counter 821.

The counter 821 loads the output signal of the third multiplier 820 by an output signal of the AND gate 813 and at the same time outputs a counter value by counting a clock signal outputted from an eleventh frequency divider 817 from a load value.

The AND gate 813 outputs a logical signal of "1" when there is no error in the ID code detected from the decoder & latch 810 and the frame synchronous signal (Synch) is detected. In more detail, the counter 821 loads the output value of the third multiplier 820 when the frame synchronous signal (Synch) is detected normally and counts a clock signal (CCLK) outputted from the eleventh frequency divider 817.

The eleventh frequency divider 817 divides the write channel clock signal (CWRT-CLK) by 14nR. Accordingly, the clock signal (CCLK) inputted to the counter 821 has the number of clocks corresponding to m/7R per frame. The count value outputted from the counter 821 shows the total clock signal (CCLK) from an initial position of a track to a present access position.

In the meantime, when an error occurs in the ID code (ID), the decoder & latch 810 maintains a count value of the counter 821 by outputting a logical "0" to the AND gate 813. Accordingly, although an error occurs in the ID code, a total number of clocks from the initial position of the track to the present can be gotten. In addition, although a frame synchronous signal (PYre) is not detected, an output signal logical value of the AND gate 813 is "0", the count value of the counter 821 is maintained.

The first divider 822 divides the count value from the counter 821 by a certain value "R", outputs its quotient to an input terminal of the latch unit 823, and outputs a remainder (RMD) to a control terminal of the latch unit 823 and flip-flop 818. In addition, the remainder (RMD) generated from the first divider 822 is outputted to the microcomputer 710 as an ID code flag signal (LID-FLAG).

The latch unit 823 converts the linear-coded ID code (LID) into a time code so as to be adaptable to the optical recording medium. In more detail, the first latch 901 outputs the quotient inputted from the first divider 822 to the second divider 902 whenever the remainder (RMD) is "0".

The second divider 902 divides an output signal of the first latch 901 by 75, provides a quotient to the third divider 903, and provides a remainder to a frame latch (FF) of the second latch 904.

The third divider 903 divides an output signal of the second divider 902 by 60, provides a quotient to a minute latch (MM) of the second latch 904, and provides a remainder to a second latch (SS) of the second latch 904. The second latch 904 outputs the ID code (LID) by being inputted output signals of the third divider 903 and second divider 902.

The logical ID code (LID) converted into the time code by the latch unit 823 includes logical address information of a record unit region different from the ATIP frame preformatted onto the optical recording medium and includes 588×98 number of channel bit. In other words, user information is recorded onto the optical recording medium in accordance with the logical address information.

The flip-flop 818 generates the ID code error discrimination signal (LID-OK) with inputs of a remainder (RMD) outputted from the first divider 822 and a reset signal (LID FLAG-RST) from the microcomputer 710 and outputs it to the microcomputer 710.

The microcomputer 710 generates a record start signal (LWRT-ON) by synchronizing with the flag signal (LID-FLAG) from the ATIP decoder 706 and generates the sub-code by using the logical ID code (LID).

The CIRC encoder 709 inserts an error correction code into the inputted recordable data. The modulation/sub code inserting unit 708 modulates recordable data outputted from the CIRC encoder 709 into an EFM code by sampling the recordable data with the write channel clock signal (CWRT-CLK) and inserts the sub-code outputted from the microcomputer 710 into the EFM frame.

The laser power controller 707 controls a laser diode of the optical pickup 701 in accordance with a record channel signal from the modulation/sub-code inserting unit 708.

In recording of user information onto an optical recording medium, the microcomputer 710 generates the record start signal (LWRT-ON) by synchronizing with a record start position (MM:SS:FF (START)) of the logical ID code (LID) outputted from the ATIP decoder 706. The modulation/sub-code inserting unit 708 generates a write signal by sampling the user information (recordable data) with the write channel clock signal (CWRT-CLK) converted in accordance with a recording density.

In the meantime, the microcomputer 710 cuts off the record start signal (LWRT-ON) at the record end position (MM:SS:FF (END)). Herein, the modulation/sub-code inserting unit 708 ends a record channel signal generation by synchronizing with the flag signal (LID-FLAG) corresponding to the record off position. The sub-code frame recorded onto the optical recording medium as a length different physically from the ATIP frame by the logical address information includes 98 EFM frames same as the prior art. Herein, when a length of unit record region in accordance with the logical ID code (LID) is shorter by setting the recording density adjustment ratio m/R bigger and the number of write channel clocks allocated to the unit record region is same, a recording density of a pertinent unit record unit can increase.

Figure 10:
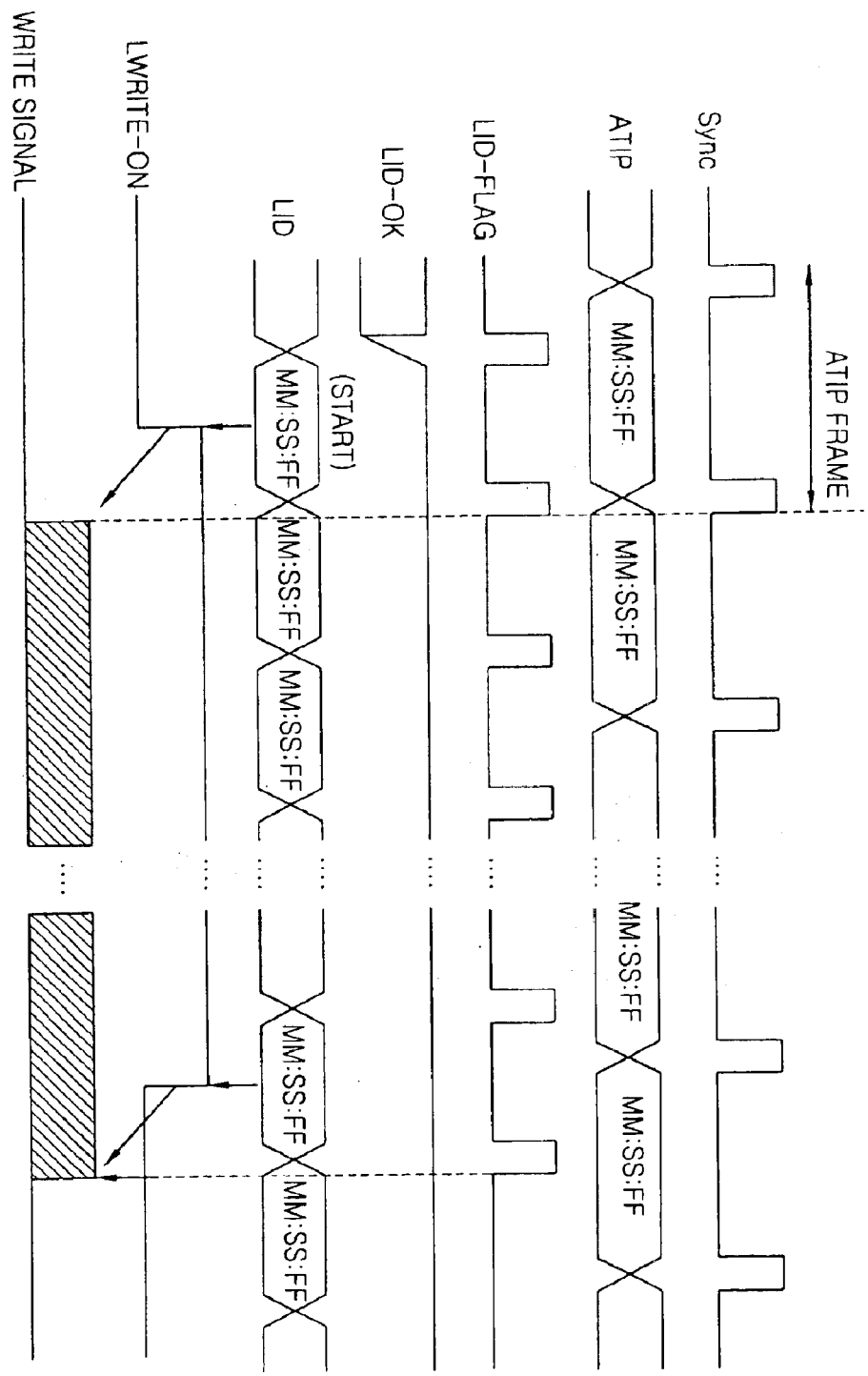
FIG. 10 is a waveform diagram illustrating an input/output of a record processing unit of the information recording/reproducing apparatus as shown at FIGS. 7~9.

FIG. 10 is a waveform diagram illustrating an input/output of the record processing unit of the information recording/reproducing apparatus as shown at FIGS. 7~9. In other words, FIG. 10 illustrates input/output of the frame synchronous signal (Synch), ATIP information, flag signal (LID-FLAG) indicating a start position of the ID code (LID) of the restored ATIP information, an error discrimination signal (LID-OK) indicating an error of the ID code, a logical address signal (LID), a record start signal (LWRT-ON).

As described above, the information recording method and apparatus in accordance with the present invention generates a logical address indicating a unit record region having a length different from a physical length of an ATIP frame preformatted onto an optical recording medium and a write channel clock signal varied in accordance with a recording density of user information included in the unit recording region. Accordingly, the information recording method and apparatus in accordance with the present invention can improve a recording density of a unit record region defined in accordance with the logical address information by making the unit record region be shorter than the ATIP frame and generating a write channel clock signal so as to be adaptable to the recording density.

In addition, the information recording method and apparatus in accordance with the present invention can efficiently provide a logical address varied in accordance with recording density variation of the unit record region by detecting an ID code in the optical recording medium, converting the detected ID code into a linear code, converting a value of the linear code in accordance with a recording density, and converting again the linear code into a time code adaptable to the optical recording medium.

As the present invention may be embodied in several forms without departing from the spirit or essential characteristics thereof, it should also be understood that the above-described embodiments are not limited by any of the details of the foregoing description, unless otherwise specified, but rather should be constructed broadly within its sprit and scope as defined in the appended claims, and therefore all changes and modifications that fall within the meets and bounds of the claims, or equivalence of such meets and bounds are therefore intended to be embraced by the appended claims.

What is claimed is:

1. An information recording method, comprising:
   adjusting a physical length of a frame of ATIP (Absolute Time In Pre-groove) information preformatted onto an optical recording medium;
   generating a logical address signal on the basis of the adjusted frame; and
   recording user information in accordance with the logical address signal.

2. An information recording method, comprising:
   converting an ID (IDentification) code of ATIP (Absolute Time In Pre-groove) information preformatted onto an optical recording medium into a linear code and adjusting a length of the converted linear code;
   generating a logical address signal by converting the adjusted linear code into a time code;
   generating a write channel clock signal varied in accordance with the logical address signal; and
   recording user information in accordance with the logical address signal.

3. In a method for recording information onto an optical recording medium, an information recording method, comprising:
   detecting a carrier signal of ATIP (Absolute Time In Pre-groove) information preformatted onto an optical recording medium;
   restoring the ATIP (Absolute Time In Pre-groove) information;
   converting an ID (IDentification) code of the restored ATIP (Absolute Time In Pre-groove) information into a linear code and adjusting a length of the converted linear code;
   generating a logical address signal by converting the adjusted linear code into a time code; and
   recording user information in accordance with the logical address signal.

4. The method of claim 3, wherein the logical address signal contains an information that the length of the recorded user information is different from the length of a physical address preformatted onto the optical recording medium.

5. The method of claim 3, wherein the linear code is varied in accordance with a recording density of the optical recording medium.

6. An information recording apparatus, comprising:
   a means for converting an ID (IDentification) code of ATIP (Absolute Time In Pre-groove) information preformatted onto an optical recording medium into a linear code and adjusting a length of the converted linear code;
   a means for generating a logical address signal by converting the adjusted linear code into a time code; and
   a means for recording user information onto a recording medium in accordance with the logical address signal.

7. The apparatus of claim 6, wherein the logical address signal contains an information that the length of the recorded user information is different from the length of a physical address preformatted onto the optical recording medium.

8. The apparatus of claim 6, wherein the linear code is converted in accordance with a recording density of the optical recording medium.

9. An information recording method, comprising:
   detecting a carrier signal in an optical recording medium preformatted as first unit regions by modulating a synchronous signal dividing a track into first unit regions having a certain volume and address information indicating the first unit regions as time information format;
   reproducing the address information by the detected carrier signal;
   converting the reproduced address information into a linear code;
   generating logical address information indicating second unit regions by counting the linear code with a clock signal varied in accordance with a volume of second unit regions different from the volume of first unit regions;
   generating a record clock signal varied in accordance with a recording density of the second unit regions; and
   recording user information onto the optical recording medium so as to correspond to the second unit regions by synchronizing with the record clock signal.

10. The method of claim 9, wherein a quantity of the user information allocated to the second unit regions is equal to a quantity of the user information allocated to the first unit regions.

11. The method of claim 9, wherein the generating process for generating the logical address information comprises the step of:
    converting the linear code indicating the second unit regions into a time code.

12. An information recording apparatus, comprising:
    a carrier signal detecting means for detecting a carrier signal in an optical recording medium preformatted as first unit regions by modulating a synchronous signal dividing a track into first unit regions having a certain volume and address information indicating the first unit regions as time information format;
    a decoding means for reproducing the address information by the detected carrier signal;
    a linear code converting means for converting the reproduced address information into a linear code;
    an address generating means for generating logical address information indicating the second unit regions by counting the linear code with a clock signal varied in accordance with a volume of the second unit regions different from the volume of the first unit regions;
    a record clock signal generating means for generating a record clock signal varied in accordance with a recording density of the second unit regions; and
    an information recording means for recording user information onto the optical recording medium so as to correspond to the second unit regions by synchronizing with the record clock signal.

13. The apparatus of claim 12, wherein a quantity of the user information allocated to the second unit regions is equal to a quantity of the user information allocated to the first unit regions.

14. The apparatus of claim 12, wherein the address generating means comprises a time code converting means for converting the linear code indicating the second unit regions into a time code.

* * * * *